United States Patent
Hayashi

(10) Patent No.: US 9,532,071 B2
(45) Date of Patent: Dec. 27, 2016

(54) RESAMPLING APPARATUS, METHOD, AND RECORDING MEDIUM HAVING RESAMPLING PROGRAM RECORDED THEREIN FOR DIGITAL IMAGE

(71) Applicant: Mitsuo Hayashi, Tokyo (JP)

(72) Inventor: Mitsuo Hayashi, Tokyo (JP)

( * ) Notice: Subject to any disclaimer, the term of this patent is extended or adjusted under 35 U.S.C. 154(b) by 0 days.

(21) Appl. No.: 14/433,032

(22) PCT Filed: Oct. 2, 2012

(86) PCT No.: PCT/JP2012/006307
§ 371 (c)(1),
(2) Date: Apr. 1, 2015

(87) PCT Pub. No.: WO2014/054068
PCT Pub. Date: Apr. 10, 2014

(65) Prior Publication Data
US 2015/0264401 A1    Sep. 17, 2015

(51) Int. Cl.
G06K 9/36 (2006.01)
G06K 9/46 (2006.01)
H04N 19/60 (2014.01)
G06T 3/00 (2006.01)
G06K 9/52 (2006.01)
G06T 7/40 (2006.01)

(52) U.S. Cl.
CPC ............... *H04N 19/60* (2014.11); *G06K 9/46* (2013.01); *G06K 9/52* (2013.01); *G06T 3/00* (2013.01); *G06T 7/40* (2013.01)

(58) Field of Classification Search
CPC ............. G06T 3/00; G06T 7/40; H04N 19/60; G06K 9/52; G06K 9/46
See application file for complete search history.

(56) References Cited

U.S. PATENT DOCUMENTS 7,532,220 B2 * 5/2009 Barenbrug ............ G06T 15/04
345/428
7,643,702 B1 * 1/2010 Brandt ............... G06K 9/00986
382/190
(Continued)

FOREIGN PATENT DOCUMENTS

JP    2005-516313 A    6/2005
JP    2006-195908 A    7/2006
(Continued)

*Primary Examiner* — Feng Niu
(74) *Attorney, Agent, or Firm* — Rabin & Berdo, P.C.

(57) ABSTRACT

It is an object of the invention to realize high quality resampling to perform flexible transformation including reduction with finite processing number of times and memory capacity without requiring any quality parameter. With the invented resampling apparatus, method, and recording medium having resampling program recorded therein for digital images, an accumulation map having a sequence common with a transformation target image is prepared. A transformation original image is scanned to renew the accumulation map corresponding to the position of the scanned pixels, based on the scanned pixels, and then, the transformation target image is scanned to renew the transformation target image based on pixels of the accumulation map corresponding to the position of the scanned pixels.

18 Claims, 16 Drawing Sheets

(56) References Cited

U.S. PATENT DOCUMENTS

| | | | |
|---|---|---|---|
| 8,094,170 B2* | 1/2012 | Kato | B60R 1/00 345/629 |
| 2005/0128209 A1 | 6/2005 | Meinds et al. | |
| 2006/0232598 A1 | 10/2006 | Barenbrug et al. | |
| 2009/0066726 A1* | 3/2009 | Kato | B60R 1/00 345/639 |
| 2013/0222377 A1* | 8/2013 | Bruls | G06T 15/00 345/419 |
| 2016/0060704 A1* | 3/2016 | Davuluri | C12Q 1/6886 506/9 |

FOREIGN PATENT DOCUMENTS

| | | |
|---|---|---|
| JP | 2007-500391 A | 1/2007 |
| JP | 2007-280267 A | 10/2007 |
| JP | 2010-251882 A | 11/2010 |
| WO | WO-2005/010826 A1 | 2/2005 |

\* cited by examiner

NORMAL CONVERSION OF COORDINATE(INPUT→OUTPUT) : Pos_OUT=11/(9-Pos_IN)-1.5
REVERSE CONVERSION OF COORDINATE(OUTPUT→INPUT) : Pos_IN=9-11/(1.5+Pos_OUT)

TEXTURE MAP (WRAPPING)

▲ : PIXELS SCANNED WITH POLYGON P
■ : PIXELS SCANNED WITH POLYGON Q

SUMMATION EXAMPLE OF A PIXEL INFORMATION SB RELATING TO ACCUMULATION MAP CORRESPONDING TO POSITIONS (A) OF TEXTURE MAP AND PIXEL INFORMATION DA

SB1+=KB1·DA
SB2+=KB2·DA
SB3+=KB3·DA
SB4+=KB4·DA w_sum(B1)+=KB1
a_sum(B1)+=KB1 × a_src(A)
r_sum(B1)+=KB1 × a_src(A) × r_src(A)
g_sum(B1)+=KB1 × a_src(A) × g_src(A)
b_sum(B1)+=KB1 × a_src(A) × b_src(A)

PRODUCTION EXAMPLE OF PIXEL INFORMATION DP CORRESPONDING TO
POSITION P RELATING TO TARGET MAP

DP=(KA1·DA1+KA2·DA2+KA3·DA3+KA4·DA4)/(KA1+KA2+KA3+KA4)

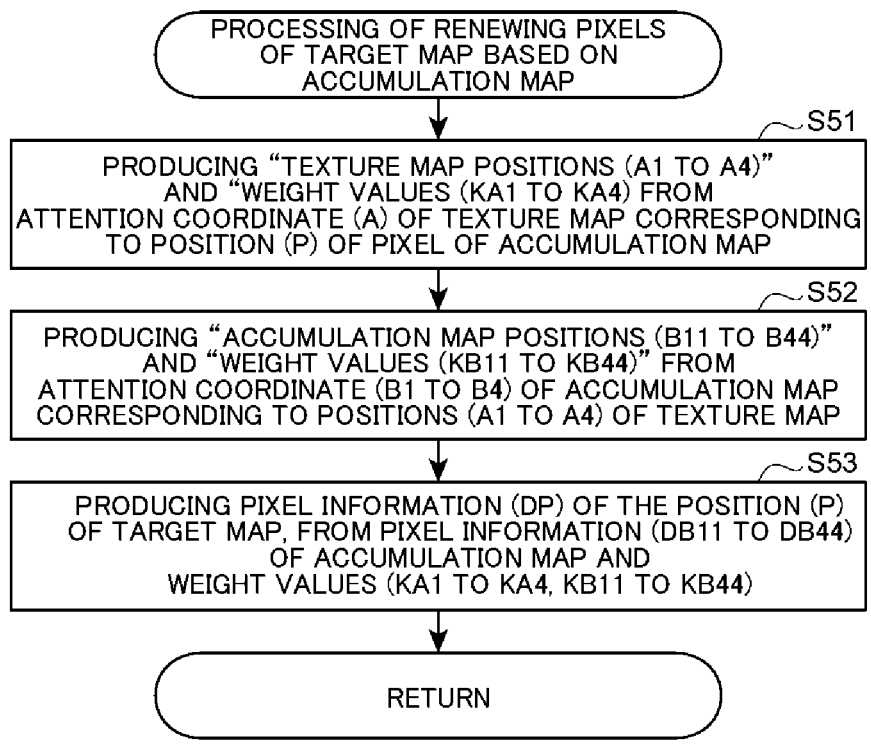

FIG.18

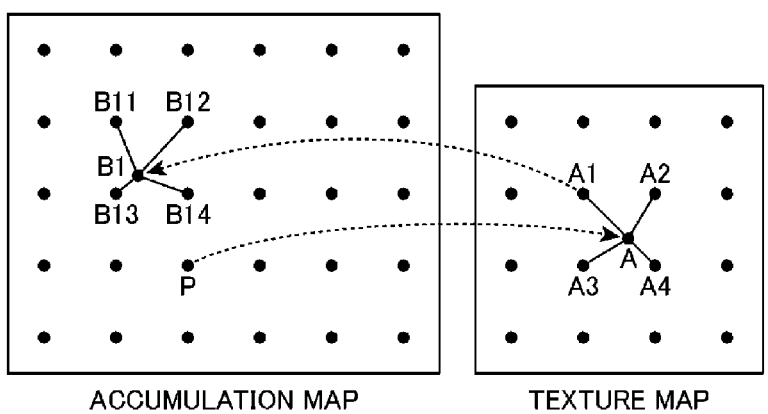

ACCUMULATION MAP                TEXTURE MAP

PRODUCING EXAMPLE OF PIXEL INFORMATION DP CORRESPONDING TO
THE POSITION P RELATING TO TARGET MAP $a(B11) = a\_sum(B11) \div w\_sum(B11)$
$r(B11) = r\_sum(B11) \div a\_sum(B11)$
$g(B11) = g\_sum(B11) \div a\_sum(B11)$
$b(B11) = b\_sum(B11) \div a\_sum(B11)$ SB11／w_sum(B11)

DP =
( KA1·(KB11·DB11+KB12·DB12+KB13·DB13+KB14·DB14)／(KB11+KB12+KB13+KB14)
+ KA2·(KB21·DB21+KB22·DB22+KB23·DB23+KB24·DB24)／(KB21+KB22+KB23+KB24)
+ KA3·(KB31·DB31+KB32·DB32+KB33·DB33+KB34·DB34)／(KB31+KB32+KB33+KB34)
+ KA4·(KB41·DB41+KB42·DB42+KB43·DB43+KB44·DB44)／(KB41+KB42+KB43+KB44) )
／(KA1+KA2+KA3+KA4)

ACCUMULATION MAP
(NORMAL CONVERSION OF COORDINATE)

TRANSFORMATION ORIGINAL IMAGE

TRANSFORMATION TARGET IMAGE
(CONSEQUENCE)

TRANSFORMATION ORIGINAL IMAGE
(REVERSE CONVERSION OF COORDINATE)

RESAMPLING APPARATUS, METHOD, AND RECORDING MEDIUM HAVING RESAMPLING PROGRAM RECORDED THEREIN FOR DIGITAL IMAGE

BACKGROUND OF THE INVENTION

1. Field of the Invention

This invention relates to a resampling apparatus, a method, and recording medium having resampling program recorded therein for digital image.

2. Description of Related Art

For high quality transformation in conventional resampling of digital images, it is important to apply transformation original images to transformation target images effectively as much as possible.

To obtain high quality transformation consequences on image transformation, various resampling methods have been used. For example, for magnifying methods, exemplified are, as methods suppressing jaggies, such as, e.g., bilinear interpolation, and bicubic interpolation. For reducing methods, exemplified are, as methods suppressing aliasing, such as, e.g., area mean method, pre-filter, post filter, trilinear filter, and isotropic filter.

Hereinafter, those methods are described below in detail.

First, the bilinear interpolation is an interpolation method having the steps of referring total four pixels of a pixel of an image prior to transformation and adjacent pixels with respect to a concerned pixel and making weighing according to the position, to decide the respective pixels of the transformation target. This method has a slower processing speed than a nearest neighbor method but is faster than a mean pixel method. The bilinear interpolation can suppress jaggies more than the nearest neighbor method.

To the contrary, bicubic interpolation is an interpolation method similar to the bilinear interpolation but refers total sixteen pixels of the transformation original and adjacent pixels with respect to the respective pixels of the transformation target. This interpolation is, so-called, a development type bilinear interpolation, and can obtain more natural smooth image quality in comparison with the bilinear interpolation.

Transformation using such a bilinear interpolation and a bicubic interpolation is done by scanning the transformation target image basically without disparity, so that it can be used for not only magnification and reduction but also image transformation of two or more dimension represented by projective transformation, rotation, and polar conversion. As a previous concern, when a method scanning not a transformation target image but a transformation original image is used, the transformation target image may not be produced entirely, and may cause some failure at a part of pixels.

Further, the area mean method is a method referring to pixel groups of the transformation previous image corresponding to a concerned pixel to decide a pixel of the transformation target, and using the average of the pixel groups. This is so called to as a mean pixel method, and is generally a method used exclusively for reduction.

The pre-filter is a method for making smoothing according to a reduction rate before reducing images.

The post-filter is a so called super sampling method, and is a reducing method dividing a pixel of the transformation target into plural pixels, referring to pixel groups of the transformation previous image corresponding to the concerned pixel, and using the average of the pixel groups, to decide the pixel of the transformation target.

The tri-linear filter is used for drawing polygons mainly for three-dimensional graphics, and is a method preparing mipmaps with, in a stepwise manner, already contracted images utilizing mean of images, and synthesizing in application of a single or plural already contracted image or images according to the contracting rate of the images. With the tri-linear filter, common deterioration that can be seen in bilinear filter images using mipmapping can be corrected.

The isotropic filter is a method used for drawing, e.g., polygons on the three-dimensional graphics, and is a method synthesizing in application of mipmaps using a referring method in consideration of texture transformation in drawing polygons as obliquely orienting a camera. This method can be said as advanced further in comparison with the bilinear interpolation and the tri-linear filter described above.

Japanese Application Publication No. 2010-251,882 discloses an image reproducing apparatus having a feature that, where an input image having M pixels is obtained through image pickup, and where the input image is treated as a resampling target image and is re-sampled, resampling produces a first reducing image and a second reducing image each having M/4 pixels, and such resampling is executed as to create positional deviations of the sampling between the first and second reducing images.

SUMMARY OF THE INVENTION

To perform high quality resampling to perform flexible transformation including reduction, it is required to use a means for making proper references with respect to each pixel of the transformation target image from a single pixel or plural pixels of the transformation original image. The flexible transformation herein refers to image transformation of two-dimension or more that can do reverse conversions of the coordinate, as represented by projective transformation, rotation, and polar conversion. With a conventional transformation method, however, high quality resampling to perform flexible transformation including reduction in the field of digital image processings, cannot be realized adequately with finite processing number of times and memory capacity without requiring any quality parameter.

In a method meaning pixel groups for reduction, likewise in a prior art, there raises a problem that the centroid of the object in the image may be shifted even in consideration of the pixel regions. For example, where plural pixels in a certain region before the transformation are concerned, and where the entire pixels come to be contained in one pixel, the centroid may not be specified. Such deviations of the centroid may show a feeling of wrongness on images making important the positional relation (e.g., formation of face) of fine lines and tiny parts.

With transformation of two or more dimension, magnification and reduction may or may not be done in all directions. That is, transformation including reduction in one direction and magnification in another direction may exist at a point that an image is located, as a standard. In such a situation, it is not easy to combine the conventional magnification method and reduction method.

The method increasing the number of reference points as the post-filter described above to improve the quality renders users possessing limited computer resources select the quality as parameter and renders them compulsively enter in a tradeoff situation, because the pixel number to be referred increases as intended to improve the quality. That is, the method cannot set the upper limit of the quality, and cannot make the processing number and the memory capacity finite.

In consideration of the above technical problems, it is an object of the invention to realize high quality resampling to perform flexible transformation including reduction with finite processing number of times and memory capacity without requiring any quality parameter. It is another object of the invention to realize resampling suppressing deviations of a centroid due to reduction. It is yet another object of the invention to realize resampling suitable for transformation in which reduction and magnification is combined at a standard point of an image.

Means for Solving Problems

To solve the above described technical problems, a resampling method according to a first aspect of the invention is a resampling method using an accumulation map having a sequence common with a transformation target image, comprising: a first step of scanning a transformation original image to renew the accumulation map based on the transformation original image; and a second step of scanning the transformation target image to renew the transformation target image based on the accumulation map.

A resampling apparatus according to a second aspect of the invention is a resampling apparatus using an accumulation map having a sequence common with a transformation target image, comprising: a display means for displaying various images; and a central control means for making control according to a resampling program, wherein the central control means executes a first step of scanning a transformation original image to renew the accumulation map based on the transformation original image, and a second step of scanning the transformation target image to renew the transformation target image based on the accumulation map.

A resampling program according to a third aspect of the invention renders a computer function as a central control means executing a first step of scanning a transformation original image to renew an accumulation map having a sequence common with a transformation target image, based on the transformation original image, and a second step of scanning the transformation target image to renew the transformation target image based on the accumulation map.

Advantages of the Invention

In accordance with the resampling apparatus, method, and program for digital image according to the invention, in the field of the digital image processing, high quality resampling to perform flexible transformation including reduction can be realized with finite processing number of times and memory capacity without requiring any quality parameter. The resampling can be realized with suppressing deviations of centroid due to reduction. The resampling further can be realized in a way suitable for transformation in which magnification and reduction is combined at a standard point of the image.

BRIEF DESCRIPTION OF THE DRAWINGS

FIG. 17 is a flowchart describing a processing flow renewing pixels of a target map based on an accumulation map, done by a resampling apparatus according to a second embodiment of the invention;

FIG. 18 is a conceptual diagram further illustrating a processing flow renewing pixels of a target map based on an accumulation map.

DETAILED DESCRIPTION OF EMBODIMENTS

Figure 1:
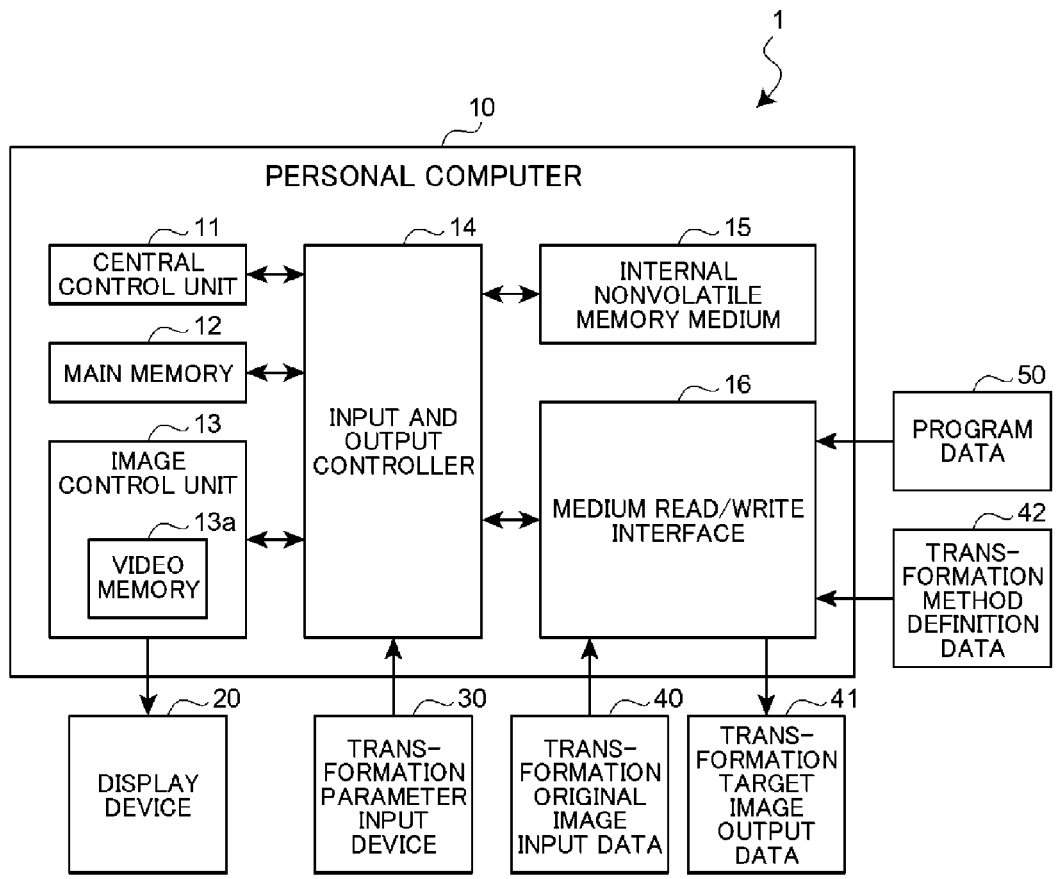
FIG. 1 is a structural diagram of a resampling apparatus according to a first embodiment of the invention.

Hereinafter, referring to the drawings, preferred embodiments according to resampling apparatus, method, and program for digital image of the invention (hereinafter, referred to as, simply, resampling apparatus, resampling method, and resampling program) is described. It is to be noted that the resampling apparatus, method, and program of this invention is not limited to the descriptions below, and is modifiable in an appropriate manner as far as not deviated from the scope of the invention. Hereinafter, those are described in detail.

First Embodiment

FIG. 1 shows a structure of a resampling apparatus according to the first embodiment of the invention for describing the apparatus.

As shown in FIG. 1, the resampling apparatus 1 is structured of, such as, a personal computer 10, a display device 20, and a transformation parameter input device 30.

The personal computer 10 includes a central control unit 11 made of such as, e.g., a processor corresponding to multitasks, a main memory 12 made of such as, e.g., RAMs (Random Access Memories) as a temporarily memorizing device, an image control unit 13 such as, e.g., a graphic card, an input and output controller 14, an internal non-volatile memory medium 15, and an medium read/write interface 16.

The image control unit 13 also includes a video memory 13a. The video memory 13a is a site temporarily storing data in substantially the same way as the main memory 12 of the body of the personal computer 10, and the memory attached to the graphic card is so called as VRAM (Video RAM). In a case where a three-dimensional graphic image is displayed on a screen, a data amount required at that time becomes large. The data completed processing at the image control unit 13 are stored in the video memory 13a and used at any time. As the video memory 13a has a much more capacity, the images, even fine three-dimensional graphic images, can be displayed more smoothly without any failure. It is to be noted that a memory standard exclusively for high speed processing so called as GDDR is unveiled these days as progressing VRAMs with higher speed, so that high speed transfer of huge data in the field of three-dimensional graphics drawing is realized.

The display device 20 is a device capable of displaying images as represented by such as, e.g., liquid crystal displays. The transformation parameter input device 30 is a device that a user can arbitrarily select parameters (e.g., scaling rate, three-dimensional rotation angle) for transforming images using transformation method definition data 42, and in other words, a device capable of coordinate entries and/or button entries as represented by mouse, touch panel, and pen tablet, as well as a device enterable with key entries, as represented by key board.

Program data 50, the transformation method definition data 42, transformation original image input data 40 are entered through the medium read/write interface 16, and the transformation target image output data 41 are delivered through the medium read/write interface 16.

The program data 50 are defined as software operable of this invention. Those include data of resampling program described below.

The transformation method definition data 42 are data corresponding uniquely and mutually between the coordinates of the transformation original image and the coordinates of the transformation target image based on the transformation parameters as represented by, e.g., tables, and formulae. Where polygon models are used, those data make polygon model data, and become objects in three-dimensional shapes. The transformation method definition data 42 can be accompanied with the program data 50, and may be made from reading data defined externally.

The transformation original image input data 40 are images handled by software. For example, where polygon models are used, those data correspond to texture images. The input texture images (transformation original images) and the like are stored in the main memory 12 temporarily. The transformation target image output data 41 are images handled by software in substantially the same way as the transformation original image input data 40. Images already transformed, which are stored temporarily in the main memory 12, are outputted as the transformation target images.

The transformation original image input data 40 and the program data 50 can be read from an external memory medium, not shown, or can be retrieved into the internal non-volatile memory medium 15 via the input output controller 14 upon reception to a communication controller, not shown, from an external computer, not shown, via the communication network. The output data can be written in an external memory medium, not shown, and can be sent to an external computer, not shown, via the communication network.

Figure 2:
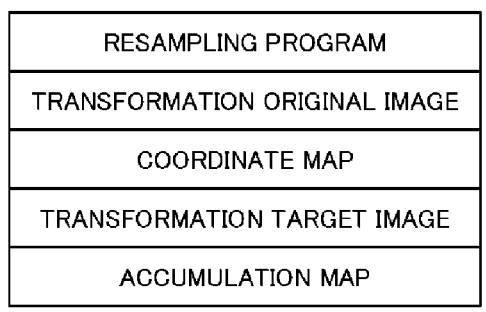
FIG. 2 is a diagram showing an example of a memory map of a main memory 12 to be used when resampling.

FIG. 2 shows an example of a memory map of the main memory 12 used when performing resampling, and it is described herein.

As shown in FIG. 2, where resampling is performed, the main memory 12 temporarily stores respective data of the resampling program, the transformation original image, the coordinate map, the transformation target image, and an accumulation map.

Figure 3:
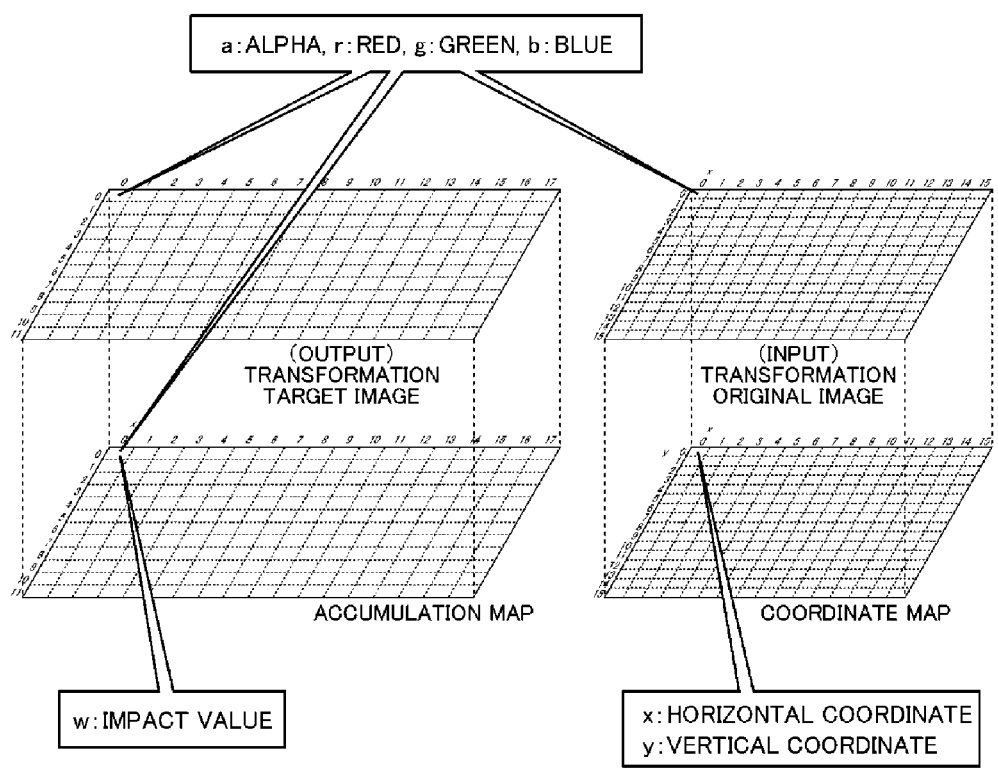
FIG. 3 is a conceptual diagram further illustrating an accumulation map and a coordinate map.

Hereinafter, referring to a conceptual diagram, FIG. 3, the accumulation map and the coordinate map are described in detail.

In resampling operation, the transformation original image indicates an image on an input side, whereas the transformation target image indicates an image on an output side. The transformation original image and the transformation target image possess pixel information including opacity and color (a: alpha, r: red, g: green, b: blue) as two-dimensional array. The term "alpha" indicates opacity information. As an example, the personal computer records color information of a single pixel as 24-bit unit basis (8 bits per one color, and three colors, red, green, blue, 8×3=24-bits). Values of the information such as red, green, and blue are referred as also "density value," and 256 scale recording is possible with 8-bit type. A PNG format with alpha (32 bit PNG) can record with opacity of each pixel having 256 scales of 8-bit type in addition to the color information. A state that the alpha value is zero means perfect transparent, and a state that the value is 255 means perfect opaque. It is to be noted that as an example of usage precisely handling color information during image processing, a format in which the density value is expanded to 65536 scales of 16-bit may be employed.

The accumulation map possess pixel information including impact value, opacity and color (w: impact value, a: alpha, r: red, g: green, b: blue) as two-dimensional array, and has a sequence common with the transformation original image, or namely has a coordinate system in the output side. The term "impact value," as described below in detail, means information for counting the pixel number, adding sequentially weighing values of the pixels, and executing an average calculation for setting color information of the pixels of the transformation target image corresponding to the pixels of the accumulation map.

It is desirable for respective values of the pixel information of the accumulation map to be a type handling adequately larger values than the pixel information of the transformation original image, or particularly, a floating-point number type where the weight value is real number, because the pixel information of the plural pixels are sequentially added from the transformation original image.

As an extreme example, the density value in the accumulation map may handle a value in which the pixel number of the transformation original image (e.g., 1000×1000) is multiplied by the maximum of the density value of the transformation original image (e.g., 255), the maximum of the alpha value of the transformation original image (e.g., 255), and the maximum of the weight value (e.g., 1.0).

The coordinate map possess coordinate information (x: horizontal coordinate, y: vertical coordinate) as two-dimensional array, and has a sequence common with the transformation original image, or namely has a coordinate system in the input side. The term "coordinate information" is used for recording converted coordinates, or namely coordinates on the output side, when a coordinate conversion is made from the transformation original image to the transformation target image. The type of respective values of the coordinate information is desirably set to types according to precision of the recorded coordinates (e.g., a floating-point number type). The coordinate map does not contribute the quality of resampling, but can be used for making resampling operate according to a second embodiment with high speed.

Figure 4:
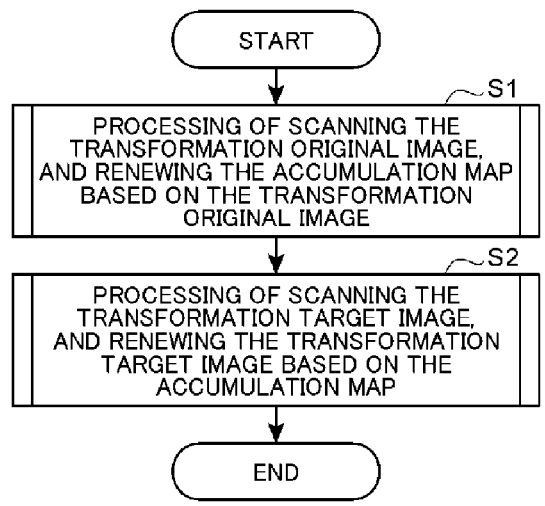
FIG. 4 is a flowchart describing a processing flow done by the resampling apparatus according to the first embodiment of the invention.

Hereinafter, referring to FIG. 4, a processing flow done by the resampling apparatus according to the first embodiment of the invention is described. This processing corresponds to a resampling method according to the first embodiment. This processing also corresponds to a processing flow when the central control unit 11 executes the resampling program in the main memory 12.

When the processing starts, the transformation original image is scanned first; a processing renewing the accumulation map based on the transformation original image is executed (Step S1); and the transformation target image is scanned subsequently. Then, a processing renewing the transformation target image based on the accumulation map (Step S2), and the processing is finished.

Thus, as a feature of the resampling done by the resampling apparatus according to the embodiment of the invention, the resampling operation includes not only scanning of the transformation target image but also scanning of the transformation original image. Details of the respective steps are described below.

Hereinafter, referring to FIG. 5, the coordinate conversion used for resampling is described in detail.

The normal conversion of the coordinates (input to output) and the reverse conversion of the coordinates (output to input) are defined as follows:

The normal conversion of the coordinates (input to output): Pos_OUT=11/(9−Pos_IN)−1.5

The reverse conversion of the coordinates (output to input): Pos_IN=9−11/(1.5+Pos_OUT)

Figure 5:
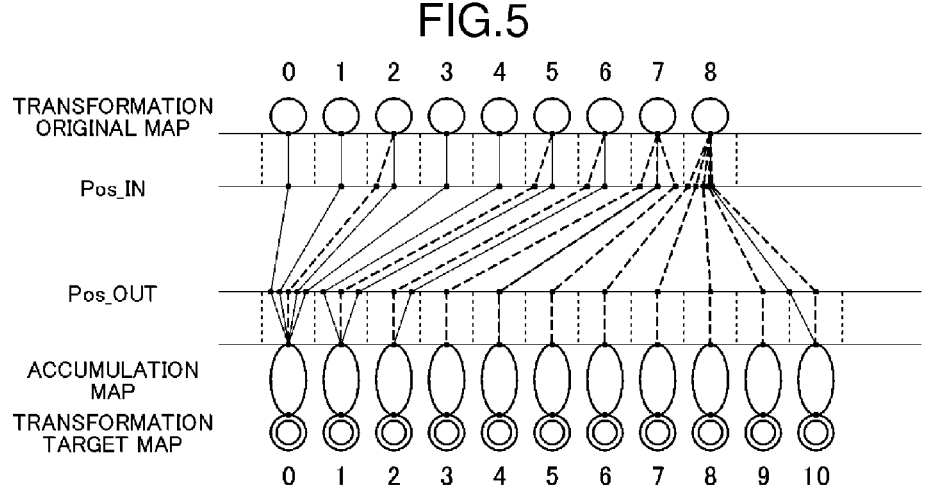
FIG. 5 is a conceptual diagram illustrating a coordinate conversion used for the resampling.

FIG. 5 exemplifies one-dimensional transformation to understandably illustrate the coordinate conversion used for resampling according to the embodiment of the invention.

In FIG. 5, the array structure of the data to be inputted is referred as a transformation original map. This corresponds to the transformation original image in two dimension. The array structure of the data to be outputted is referred as a transformation target map. This corresponds to the transformation target image in two dimension.

Circle indicates each element of the transformation original map, and herein, as an example, nine elements (0 to 8) of one-dimension array are shown. Double circle indicates each elements of the transformation target map, and herein, as an example, eleven elements (0 to 10) of one-dimension array are shown. Oval indicates each element of the accumulation map. A contact point "small circle" indicates that the accumulation map has a sequence common with the sequence of the transformation target map, and as an example, eleven elements of one-dimension array are shown.

A horizontal line contacting the circle indicates a coordinate system of integers coupled to the positions of the elements of the transformation original map. A horizontal line below the circle indicates a coordinate system of real numbers relating to the transformation original map. A horizontal line above the oval indicates a coordinate system of real numbers relating to the accumulation map. A horizontal line contacting the oval indicates a coordinate system of integers coupled to the positions of the elements of the accumulation map.

Regarding folded lines connecting the circle and the oval, a solid line indicates an example of a conversion leading positions of the elements of the accumulation map or transformation target map corresponding to the positions of the elements of the transformation original map, or namely the normal conversion, whereas a broken line indicates an example of a conversion leading positions of the elements of the transformation original map corresponding to the positions of the elements of the accumulation map or transformation target map, or namely the reverse conversion. The coordinates of the transformation original map and the coordinates of the transformation target map are defined as formulae so as to make mutual and unique correspondences.

In the example shown in FIG. 5, when viewing only the positions of the elements of the transformation original map corresponding to the positions of the elements of the transformation target map, a position (0, 1, 3, 4) not corresponding exists consequently. This is a part corresponding to reduction in the image transformation, and may cause occurrences of aliasing due to leakage of references.

To the contrary, when viewing in an overlapping manner the positions of the elements of the transformation target map corresponding to the positions of the elements of the transformation original map, the part not corresponded can be compensated. As a method for realizing this, the invention uses means scanning the transformation original map uniformly.

As described below, the resampling in this invention is operable for arrays of two or more dimension, and can be utilized in the fields such as, e.g., image processing.

Hereinafter, referring to the flowchart in FIG. 6, a processing flow scanning a transformation original image and renewing an accumulation map based on the transformation original image, done by the resampling apparatus according to the first embodiment of the invention, is described. This corresponds to the detailed processing of Step S1 in FIG. 4. This step also corresponds to a part of the resampling method, and corresponds to a part of the processing when the central control unit 11 executes the resampling program in the main memory 12.

The processing of this flowchart is an example of texture mapping using a polygon model, in which a transformation original image is scanned, and the normal conversion of the positions is executed at respective pixels. The texture map corresponds to the transformation original image. The accumulation map is completed at a returning time, and is used for processing renewing the transformation target image subsequently.

That is, when this processing begins, the accumulation map is initialized (Step S11), and it is judged as to whether extraction of the entire polygon planes is completed (Step S12). If the extraction of the entire polygon planes is not yet completed (proceeding to "NO" at Step S12), the subsequent polygon plane is extracted (Step S13), and it is judged as to whether extraction of the entire pixels of the polygon plane at the texture map is completed (Step S14). If the extraction of the entire pixels is not yet completed (proceeding to "NO" at Step S14), the subsequent pixel of the texture map is extracted (Step S15), and the processing renewing the pixel group of the accumulation map corresponding to the pixel of the texture map is executed (Step S16), thereby returning to Step S14. The processing of Steps S14 to S16 is repeated until the completion of the extraction of the entire pixels contained in the polygon plane at the texture map, and the processing returns to Step S12 when the extraction is completed (proceeding to "YES" at Step S14). The processing of Step S12 to S16 is thus repeated until the completion of the extraction of the entire polygon planes, and when the extraction is completed (processing to "YES" at Step S12), the processing returns.

Figure 6:
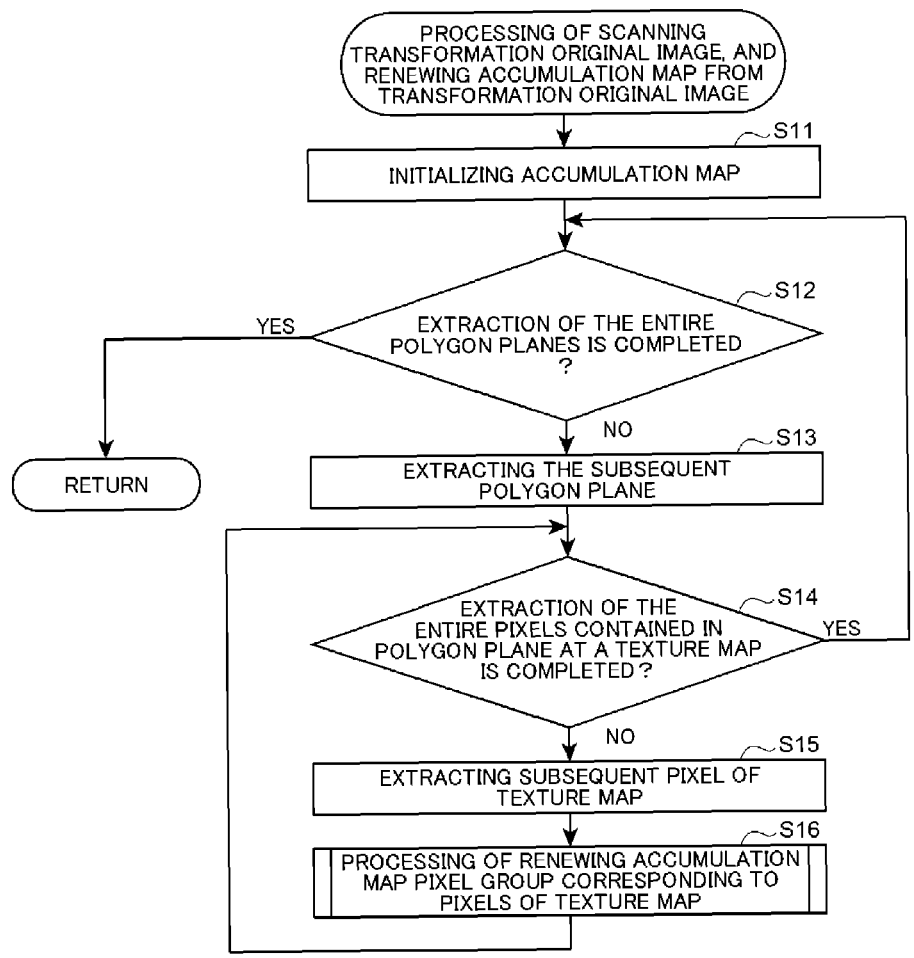
FIG. 6 is a flowchart describing a processing flow scanning a transformation original image and renewing an accumulation map based on the transformation original image, done by the resampling apparatus according to the first embodiment of the invention.

The flowchart in FIG. 6, however, is the example presuming the polygon model made of the plural polygons (i.e., plural transformation methods), and Steps S12, S13 are omittable when the polygon is single or when a single table or formula is used at the transformation method definition data 42. In other words, when this processing begins, the processing of Steps 14 to 16 is repeated, and when the extraction is completed (proceeding to "YES" at Step S14), the processing returns.

It is to be noted that the term "texture map" has the same meaning as the term "transformation original image," whereas the term "polygon plane" has the same meaning as the term "range to be transformed" in the transformation original image.

Hereinafter, referring to FIG. 7, a process scanning the transformation original image and renewing the accumulation map based on the transformation original image is further described in detail.

Herein, texture mapping using a polygon model is exemplified as image transformation capable of reversely converting the two-dimensional coordinate according to the invention. This is an example drawing a rectangular model setting arbitrary posture and position on a three-dimensional space, and in other words, this corresponds transformation including projective transformation and rotation. The rectangular model is deemed as two triangle polygons, which are set as a polygon P and a polygon Q, respectively. A map located on a right upper side indicates a texture map, or namely corresponds to a transformation original image. A map located on a left upper side indicates an accumulation map, and has a coordinate common with a target map corresponding to a transformation target image described below.

The pixel of the texture map possess pixel information containing opacity and color (a_src: alpha, r_src: red, g_src: green, b_src: blue). The pixel of the accumulation map possess pixel information capable of adding, including impact value, opacity, and color (w_sum: impact value, a_sum: alpha, r_sum: red, g_sum: green, b_sum: blue). In each of the texture map and the accumulation map, the pixels are arranged in two-dimension, and the unit of the coordinates (horizontal direction and vertical direction) is one pixel as one. For illustration purpose, boundaries of the regions of pixel are indicated with lattices in broken lines.

First, the accumulation map is initialized, or namely, the impact value and color information of the entire pixels of the accumulation map are clarified to zero. Next, the range surrounded by the respective polygons on the texture map side is scanned uniformly. The position of the scanning target pixel is set to (i, j), where i indicates a horizontal portion whereas j indicates a vertical position. In the texture map, a scanning target pixel relating to the polygon P is shown with a black filled triangle mark, whereas a scanning target pixel relating to the polygon Q is shown with a black filled cubic mark. The input and output relationship of the pixel information is indicated with broken line arrows, and means transfers from the texture map to the accumulation map.

Figure 7:
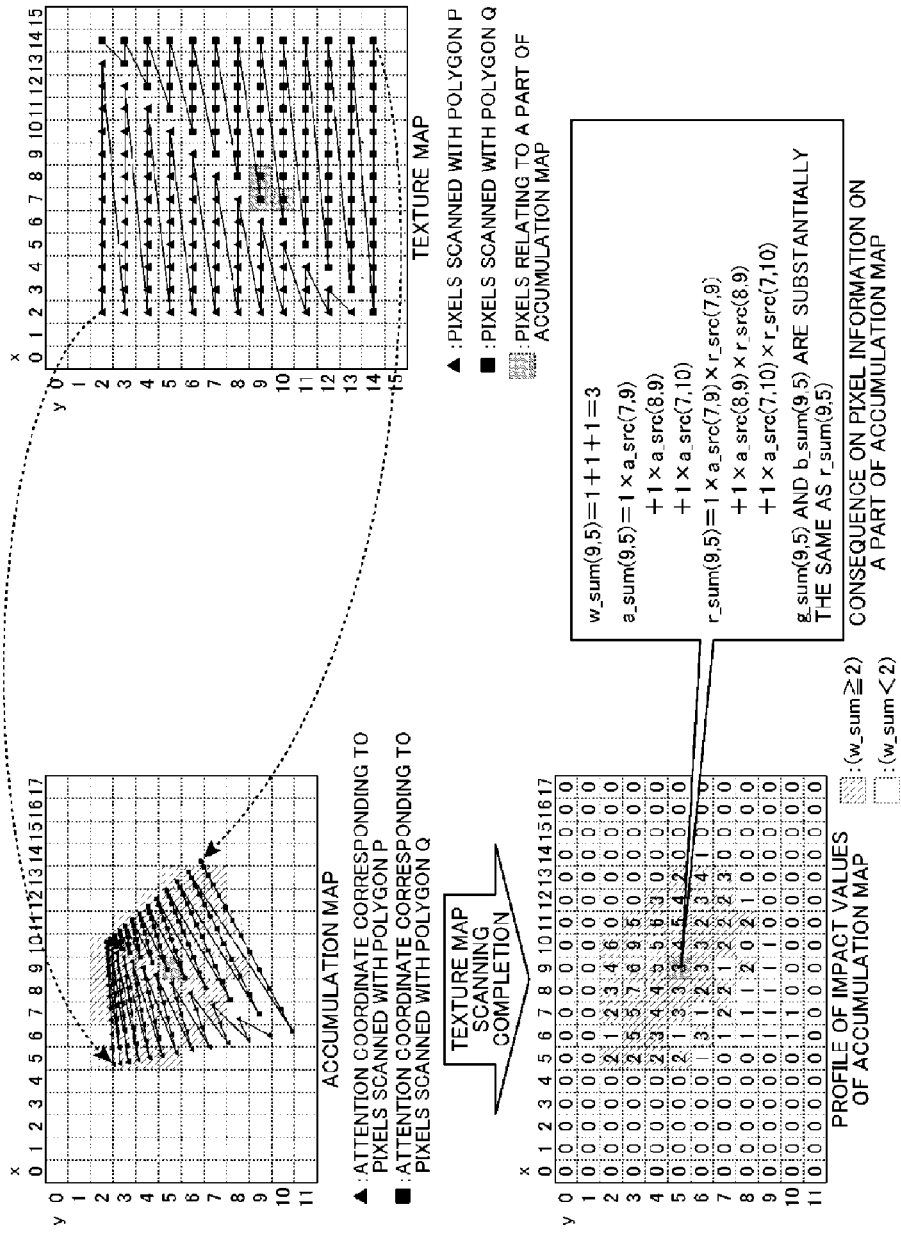
FIG. 7 is a conceptual diagram illustrating processes of scanning a transformation original image and renewing an accumulation map based on the transformation original image.

Regarding the scanning target pixels, an attention coordinate on an accumulation map side is derived according to a transformation method as shown in FIG. 7 from the position of the concerned pixel. Herein, in the accumulation map, an attention coordinate relating to the polygon P is shown with a black filled triangle mark, whereas an attention relating to the polygon Q is shown with a black filled cubic mark. The attention coordinates derived at this stage are not limited to a pixel unit basis (e.g., real number).

A pixel of the accumulation map relating to the attention coordinate is determined as a renewing target pixel. Herein, in following a deriving method for positions using a conventional nearest neighbor method, exemplified is a method in which a pixel located at a position nearest to the attention coordinate, or namely a pixel in a region containing the attention coordinate, is used as a renewing target pixel. It is to be noted that, as a different point from a conventional nearest neighbor interpolation, the pixel of the sought position is not on an input side but on an output side. Herein, the position of the renewing target pixel in the accumulation map corresponding to (i, j) is set to (x, y), where x indicates a horizontal position, and y indicates a vertical position, Next, using information a_src (i, j), r_src (i, j), g_src (i, j), and b_src (i, j) as pixel information of the scanning target pixel of the texture map, information w_sum (x, y), a_sum (x, y), r_sum (x, y), g_sum (x, y), and b_sum (x, y), as pixel information of the renewing target pixel of the accumulation map, is renewed as follows (hereinafter, position (i, j) and (x, j) are omitted).

That is,
with respect to w_sun, only a constant value (e.g., one) is added;
with respect to a_sum, only a_src is added;
with respect to r_sum, only a value that a_src is multiplied by r_src is added;
with respect to g_sum, only a value that a_src is multiplied by g_src is added; and
with respect to b_sum, only a value that a_src is multiplied by b_src is added.

It is to be noted that, in a case where only an image perfectly opaque is handled, a_src can be replaced with a constant value (e.g., one), and a_sum can be replaced with w_sum. That is, renewing the renewing target pixel of the accumulation map can be simplified as follows:
with respect to w_sun, only a constant value (e.g., one) is added;
with respect to r_sum, only r_src is added;
with respect to g_sum, only g_src is added; and
with respect to b_sum, only b_src is added.

In accompany with the processing as described above, scanning of the texture map of the respective polygons is made completed.

A map located on a left lower side in FIG. 7 shows a distribution of added impact value w_sum in the accumulation map with numerical values. For the purpose of illustration, regions shown with hatching indicate pixels having the impact value of a constant value (e.g., two), and details are described below.

A gray region is an example of a part of correspondences between the texture map and the accumulation map, and exemplified is that three pixels of the positions (7, 9), (8, 9), and (7, 10) in the texture map are subject to renewing the pixel located at the position (9, 5) in the accumulation map.

A box located on a right lower side in FIG. 7 shows an example of additions done with the pixel at the position (9, 5) in the accumulation map, as the scanning consequence of the texture map.

According to the rules described above, addition is made as follows:

w_sum(9,5)=1+1+1=3, a_sum(9,5)=1×a_src(7,9)+1×a_src(8,9)+1×a_src(7,10)

r_sum(9,5)=1×a_src(7,9)×r_src(7,9)+1×a_src(8,9)×r_src(8,9)+1×a_src(7,10)×r_src(7,10)

g_sum (9, 5) and b_sum (9, 5) can be sought in substantially the same way as the r_sum (9, 5).

Figure 8:
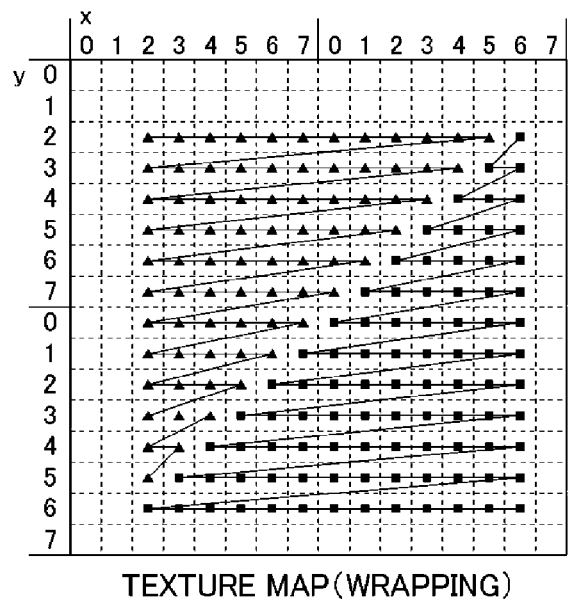
FIG. 8 is a conceptual diagram showing a situation that a texture map is wrapping (or namely, repeating)

It is to be noted that, as the example shown in FIG. 8, if the texture map is a wrapping (i.e., repeating), in a case where regions surrounded by the respective polygons are scanned uniformly on the side of the texture map described above, scanning is made in consideration of repeating. For example, the pixel at the position (2, 2) becomes the scanning target three times with the polygon P, one time with the polygon Q, total four times.

Figure 9:
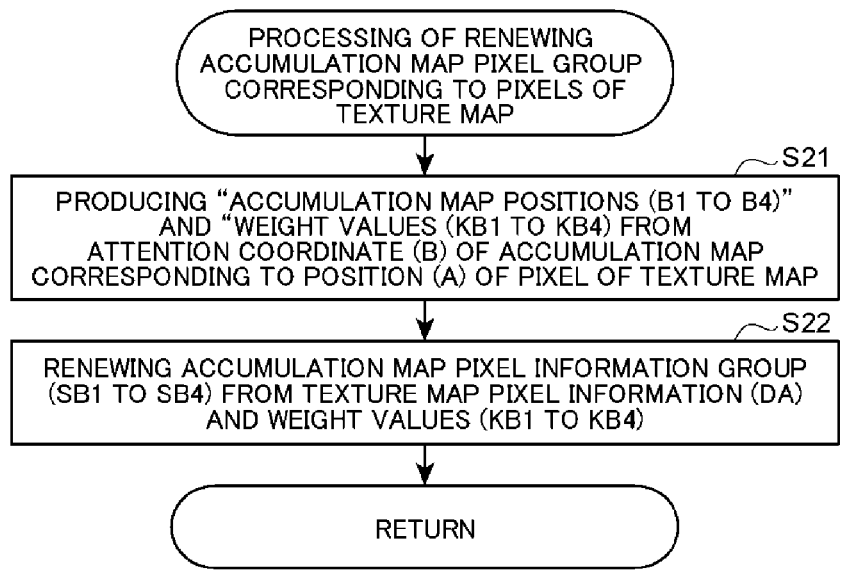
FIG. 9 is a flowchart describing a processing flow renewing pixel groups of the accumulation map corresponding to pixels of the texture map, done by the resampling apparatus according to the first embodiment of the invention.

Referring to the flowchart in FIG. 9, a processing flow for renewing pixel groups of the accumulation map corresponding to pixels of the texture map, done by the resampling apparatus according to the first embodiment of the invention, is described next. This corresponds to the detail of the processing at Step S16 in FIG. 6. This also corresponds to a part of the resampling method, and corresponds to a part of the processing when the central control unit 11 executes the resampling program in the main memory 12.

This flowchart shows a part of a means suppressing deviations of the centroid due to reduction. When this processing begins, data "accumulation map positions (B1 to B4)" and "weight value (KB1 to KB4)" are produced from the accumulation map attention coordinate (B) corresponding to the position (A) of the pixel of the texture map (Step S21). Then, renewing the accumulation map pixel information group (SB1 to SB4) is made from texture map pixel information (DA) and weight value (KB1 to KB4), and the processing returns.

It is to be noted that the texture map has the same meaning as the transformation original image.

Hereinafter, referring to a conceptual diagram in FIG. 10, the processing flow renewing the pixel groups of the accumulation map corresponding to pixels of the texture map is described in detail.

Figure 10:
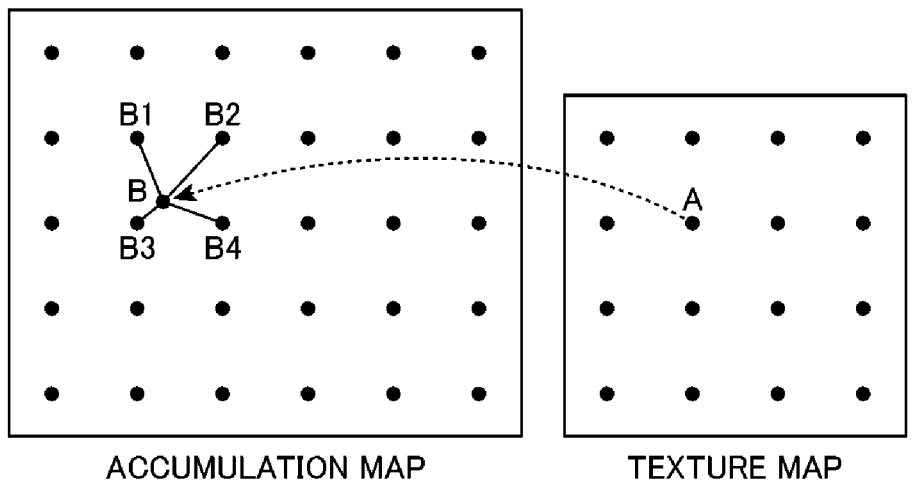
FIG. 10 is a conceptual diagram further illustrating a processing flow renewing the pixel groups of the accumulation map corresponding to pixels of the texture map.

In the example described above, a pixel located at a position nearest neighbor to the attention coordinate is made as a renewing target pixel according to a deriving method of a position in the conventional nearest neighbor method, In an example shown in FIG. 10, as a method suppressing deviations of the centroid in transformation, plural pixels (e.g., two in the horizontal direction and two in the vertical direction, 2×2=4) located near the attention coordinate are made as the renewing target pixels according to a deriving method of the positions and a weighing method in a conventional bilinear method. As a different point from the conventional bilinear method, it is to be noted that the plural pixels to be weighed are not on the input side but on the output side. A detailed description is as follows.

First, an attention coordinate B of the accumulation map corresponding to the position A of the scanning target pixel in the texture map is sought through a normal conversion. An arrow of a broken line extending from A to B indicates the normal conversion of the coordinate. Where the coordinate map is used, the horizontal coordinate and the vertical coordinate of B are memorized in an element of the position A of the coordinate map. With this step, it is unnecessary to seek the attention coordinate B corresponding to the position A again later.

The positions of the four pixels near the attention coordinate are set to B1, B2, B3, and B4, respectively. Weighing is made according to the distance to B at the four positions, respectively, thereby deriving weight values KB1, KB2, KB3, and KB4. The total of the four weight values is set to a constant value (e.g., one).

The pixel information relating to position A is set to DA, and the pixel information SB1 relating to the position B1 is added with "DA considering KB1" from the current value.

That is, using information a_src (A), r_src (A), g_src (A), and b_src (A), as the pixel information on the scanning target pixels of the texture map, information w_sum (B1), a_sum (B1), r_sum (B1), g_sum (B1), b_sum (B1) as the pixel information on the renewing target pixels of the accumulation map are renewed, respectively, as follows (hereinafter, (A) and (B) of the positions are omitted).

That is,
with respect to w_sum, only KB1 is added;
with respect to a_sum, only a value that KB1 is multiplied by a_src is added;
with respect to r_sum, only a value that KB1 is multiplied by a_src and r_src is added;
with respect to g_sum, only a value that KB1 is multiplied by a_src and g_src is added; and
with respect to b_sum, only a value that KB1 is multiplied by a_src and b_src is added.

These executions are indicated as "SB1+=KB1*DA" as a simplified indication. The term "+=" means addition to the left side itself, and in other words, the consequence of "SB1+KB1*DA" is substituted for SB1.

If only an image perfectly opaque is handled, the information a_src can be replaced with a constant value (e.g., one), and the information a_sum is replaceable with information w_sum. That is, the renewal of the renewing target pixels in the accumulation map can be simplified as follows:
with respect to w_sum, only KB1 is added;
with respect to r_sum, only a value that KB1 is multiplied by r_src is added;
with respect to g_sum, only a value that KB1 is multiplied by g_src is added; and
with respect to b_sum, only a value that KB1 is multiplied by b_src is added.

The pixel information SB2, SB3, and SB4 relating to the positions B2, B3, and B4 is also subject to the addition in substantially the same way as described above.

Thus, although the object of deriving the positions and weighing is addition of the pixel information of the renewing target pixels, the deriving method of the pixel positions and the weighing method for purpose of references in the prior art are applicable. Similarly, such as a bicubic method is also applicable.

Hereinafter, referring to the flowchart shown in FIG. 11, a processing flow scanning a transformation target image and renewing the transformation target image based on an accumulation map, done by the resampling apparatus according to the first embodiment of the invention, is described. This corresponds to Step S2 in FIG. 4. This also corresponds to a part of the resampling method, and corresponds to a part of the processing when the central control unit 11 executes the resampling program in the main memory 12.

This flowchart is an example of a texture mapping using a polygon model, and is a description for scanning the transformation target image. The target map corresponds to the transformation target image.

That is, when this processing begins, a judgment is made as to whether extraction of the entire polygon planes is completed (Step S31), and if the extraction is not yet completed (proceeding to NO at Step S31), the subsequent polygon plane is extracted (Step S32). Then, a judgment is made as to whether extraction of the entire pixels contained in the polygon plane at the target map is completed (Step S33), if it is not yet completed (proceeding to NO at Step S33), the subsequent pixel of the target map is extracted (Step S34), and a processing renewing the pixel of the target map is made based on the accumulation map (Step S35), thereby returning to Step S33. Thus, the processing from Step S33 to Step S35 is repeated until completion of the extraction of the entire pixels contained in the polygon plane at the target map, and if the extraction of the entire pixels is completed (proceeding to YES at Step S33), the processing returns to Step S31. The processing from Step S31 to Step S35 is repeated until completion of the extraction of the entire polygon planes, and if the extraction is completed (proceeding to YES at Step S31), the processing returns.

Figure 11:
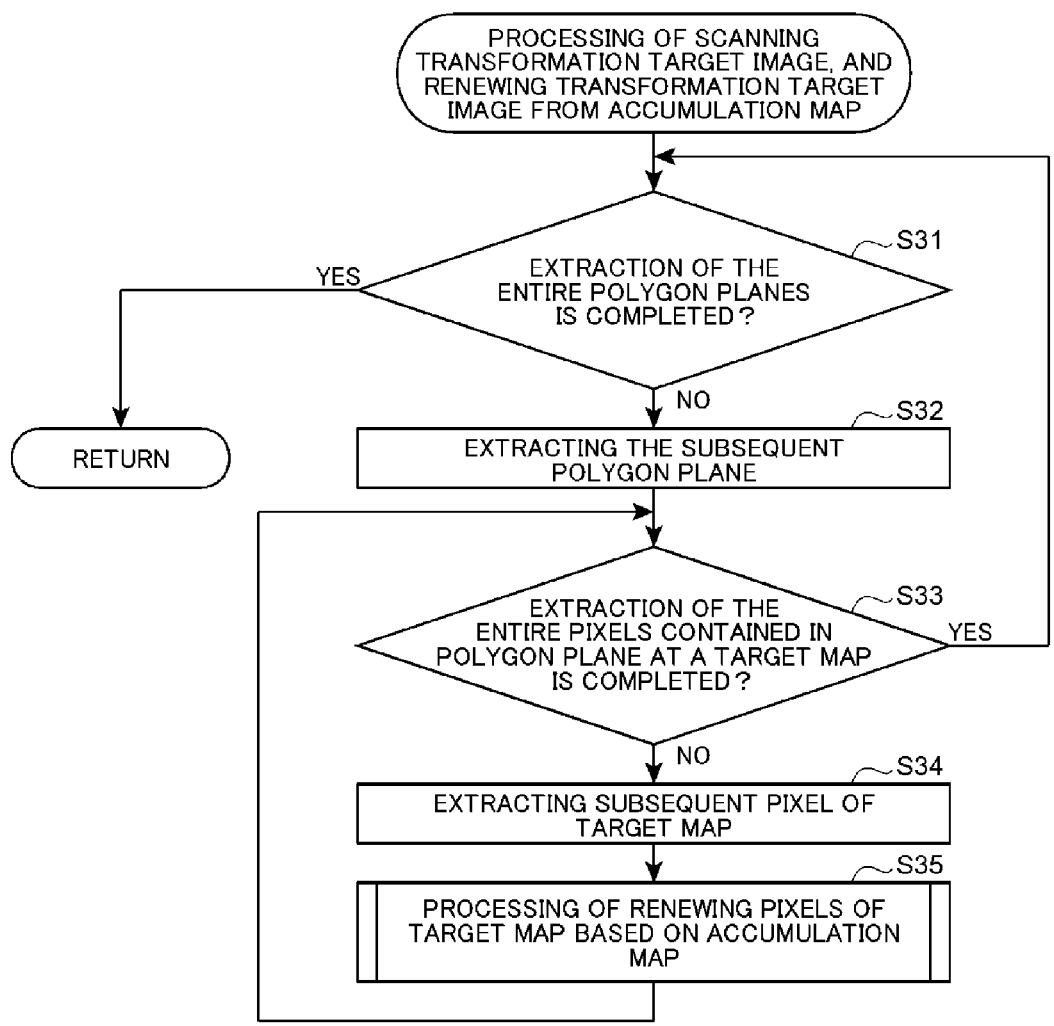
FIG. 11 is a flowchart describing a processing flow scanning a transformation target image and renewing the transformation target image based on an accumulation map, done by the resampling apparatus according to the first embodiment of the invention.

The flowchart shown in FIG. 11 is an example presuming a polygon model made of plural polygons (or namely, plural transformation methods are used), and if the polygon is single or if a single table or formula is used at the transformation method definition data 42, Steps S31, S32 are omittable. That is, when the processing begins, the processing from Step S 33 to Step S35 is repeated, and when the extraction is completed (proceeding to YES at Step S33), the processing returns.

It is to be noted that the term "target map" has the same meaning as the term "transformation target image," and the term "polygon plane" has the same meaning as the term "range to be transformed" in the transformation original image.

Figure 12:
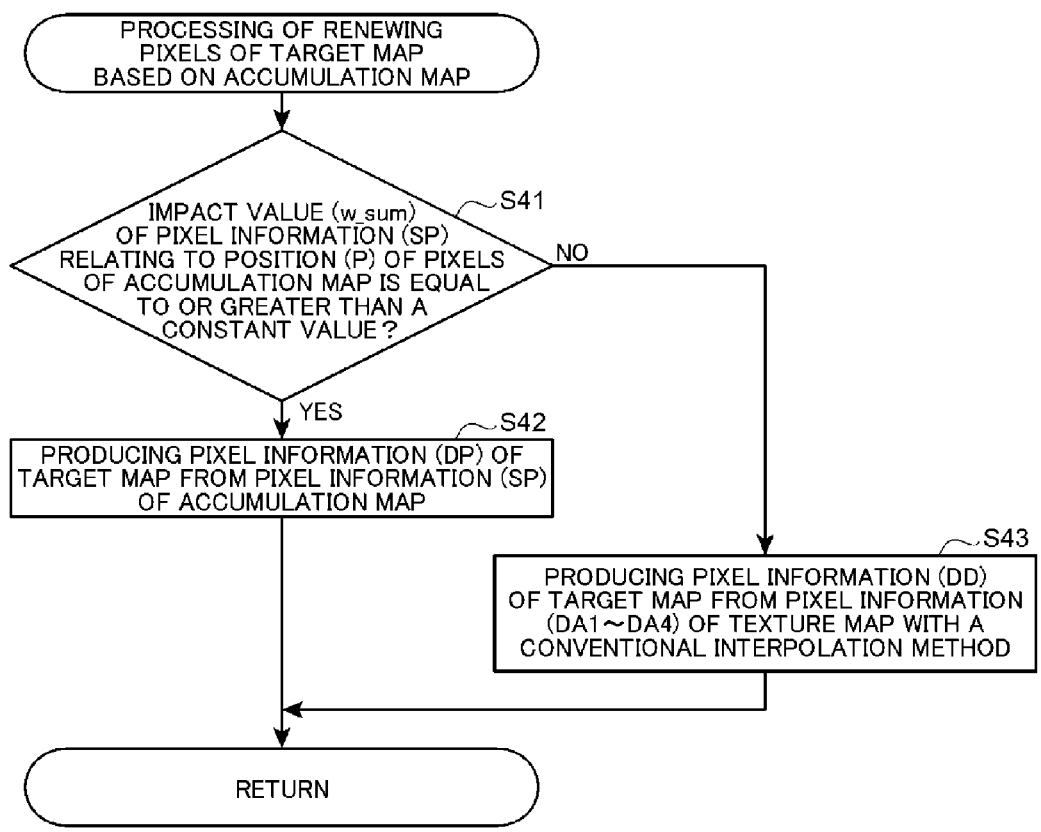
FIG. 12 is a flowchart describing a processing flow renewing pixels of a target map based on an accumulation map.

Referring to FIG. 12, the processing flow renewing the pixels of the target map based on the accumulation map is described. This corresponds to the detailed processing at Step S35 in FIG. 11. This also corresponds to a part of the resampling method, and corresponds to a part of the processing when the central control unit 11 executes the resampling program in the main memory 12. This flowchart is an example simply renewing the pixels of the target map, and shows means suppressing deviations of the centroid in a case of reduction. It is to be noted that a means suitable for transformation combined with reduction and magnification at a standard point of an image is not described herein but described later.

When this processing begins, first a judgment is made as to whether the impact value (w_sum) of the pixel information (SP) relating to the position (P) of the pixel of the accumulation map is equal to or greater than a constant value (Step S41). If the impact value (w_sum) is equal to or greater than the constant value (proceeding to YES at Step S41), the pixel information (DP) of the target map is produced from the pixel information (SP) of the accumulation map (Step S42), and the processing returns. On the other hand, if the impact value (w_sum) is less than the constant value (proceeding to NO at Step S41), the pixel information (DP) of the target map is produced from the pixel information DA1 to DA4 of the texture map with the conventional interpolation method (Step s43), and the processing returns.

It is to be noted that the term "target map" has the same meaning as the term "transformation target image," and the term "texture map" has the same meaning as the term "transformation original image."

Hereinafter, referring to a conceptual diagram in FIG. 13, a processing scanning the transformation target image and renewing the transformation target image based on the accumulation map, done by the resampling apparatus according to the first embodiment of the invention, is described in detail.

Figure 13:
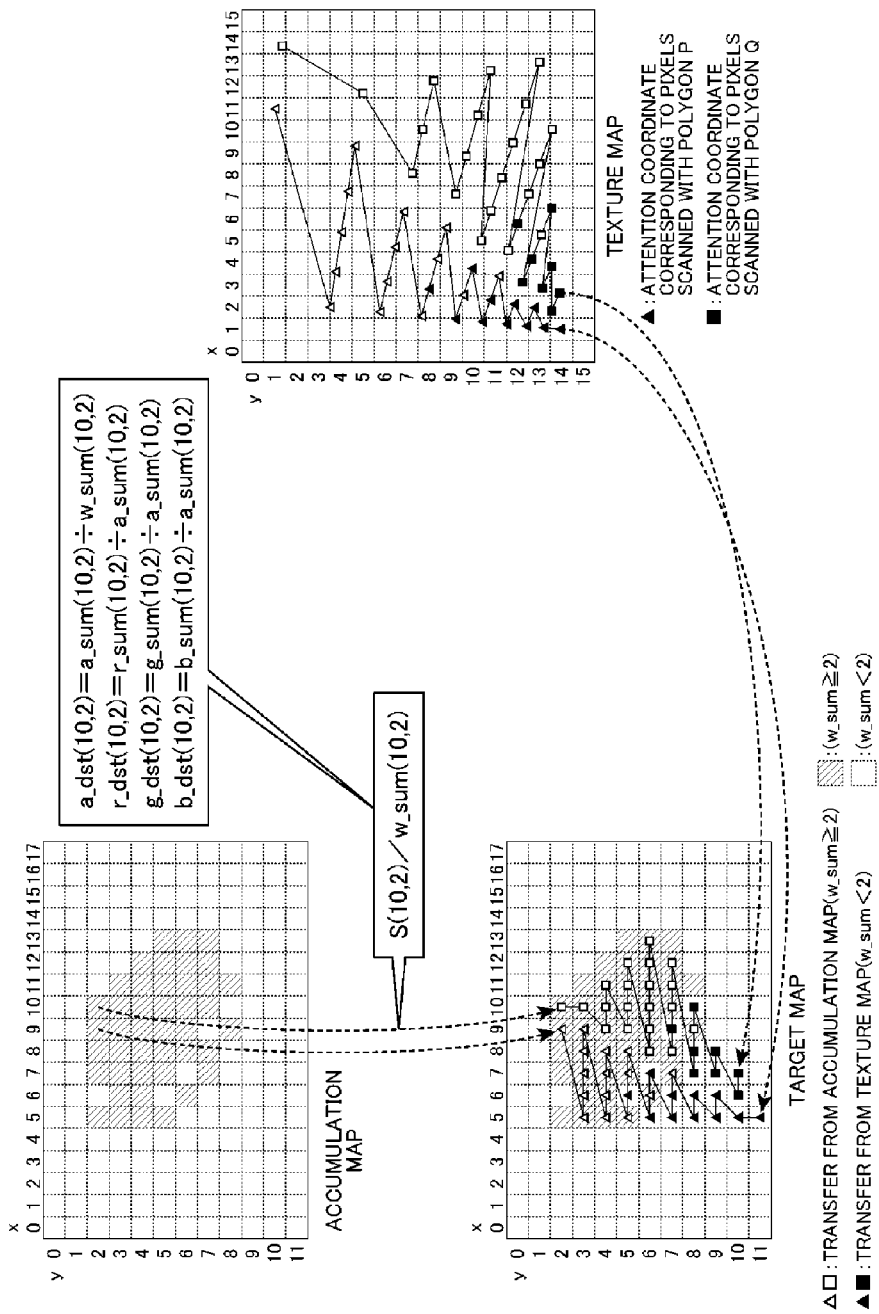
FIG. 13 is a conceptual diagram illustrating processes of scanning a transformation target image and renewing the transformation target image based on an accumulation map, done by the resampling apparatus according to the first embodiment of the invention.

A map on a right side in FIG. 13 is a texture map described above corresponding to the transformation original image. A map on a left upper side in FIG. 13 is an accumulation map described above, and shows a state that scanning of the texture map side is completed. A map on a left lower side in FIG. 13 is a target map corresponding to the transformation target image.

The pixel of the target map possess the pixel information containing opacity and color (a_dst: alpha, r_dst: red, g_dst: green, b_dst: blue).

The pixel is arranged in two-dimension for each of the texture map, the target map, and the accumulation map, and a unit of the coordinates (horizontal direction, vertical direction) is set to one per one pixel, and the boundaries of the pixel region are indicated with a lattice of broken lines.

On the side of the target map, a range surrounded by the respective polygons is scanned uniformly. The position of the scanning target pixel is set to (i, j), wherein i is the horizontal position and j is the vertical position. As described above, the accumulation map has a coordinate system common with the target map, (i, j) can be indicated as the position of the pixel of the accumulation map corresponding to the position of the scanning target pixel. In the target map, the scanning target pixel relating to the polygon P is indicated as a black filled triangle mark or white triangle mark, whereas the scanning target pixel relating to the polygon Q is indicated as a black filled cubic mark or white cubic mark.

Input and output relationships of the pixel information are indicated with arrows of broken lines, and have a meaning of transfer from the accumulation map to the target map and transfer from the texture map to the target map. Herein, the white triangle mark and the white cubic mark indicate that the impact value w_sum (i, j) is equal to or greater than a constant value (e.g., two), and the black filled triangle mark and the black filled cubic mark indicate that the impact value w_sum (i, j) is less than the constant value (e.g., two). The different renewing methods for renewing target pixels are used for different cases that the impact value w_sum (i, j) is equal to or greater than two and that is less than two.

Regarding the scanning target pixels, first, the impact value w_sum (i, j) of the pixel of the accumulation map corresponding to the position of the concerned pixel is read out. Where the impact value w_sum (i, j) of the accumulation map is equal to or greater than two, it is thought as locally reduction equivalent, and it is assumed that the number of the pixels of the texture map engaged for the pixel is enough, so that the average of the engaged pixels is used.

That is, using the pixel information in the accumulation map w_sum (i, j), a_sum (i, j), r_sum (i, j), g_sum (i, j), and b_sum (i, j), the pixel information of the renewing target pixel of the target map a_dst (i, j), r_dst (i, j), g_dst (i, j), and b_dst (i, j) are renewed respectively as follows (hereinafter, position (i, j) is omitted).

That is, with respect to a_dst, a value that a_sum is divided by w_sum is substituted;

with respect to r_dst, a value that r_sum is divided by a_sum is substituted;

with respect to g_dst, a value that g_sum is divided by a_sum is substituted; and with respect to b_dst, a value that b_sum is divided by a_sum is substituted.

The pixel information of the accumulation map is set to S(i, j), and the operation is expressed as simply "S(i, j)/w_sum(i, j)."

If an image perfectly opaque is handled, a_sum can be replaced with w_sum, as described above. That is, the renewal of the renewing target pixel of the target map can be written alternatively as follows:

That is, with respect to r_dst, a value that r_sum is divided by w_sum is substituted;

with respect to g_dst, a value that g_sum is divided by w_sum is substituted; and with respect to b_dst, a value that b_sum is divided by w_sum is substituted.

Where the impact value w_sum (i, j) of the pixel of the accumulation map corresponding to the position of the scanning target pixel is less than two, it is thought as locally magnification equivalent, and it is assumed that the number of the pixels of the texture map engaged with the concerned pixel is not adequate. In such a case, the pixel information of the concerned pixel is not used, and the pixel information of the renewing target pixel in the target map is renewed using a value calculated from interpolation based on a conventional texture mapping (e.g., bilinear interpolation).

That is, regarding the scanning target pixel, the attention pixel on the side of the texture map is derived according to the transformation method as shown in FIG. 13 from the position relating to the concerned pixel. The attention coordinate relating to the polygon P in the texture map is indicated as the black filled triangle mark, and the attention coordinate relating to the polygon Q is indicated as the black filled cubic mark. It is to be noted that the derived attention coordinate is not limited to a pixel unit (can be, e.g., a real number) at this stage.

Subsequently, the pixels of the texture map relating to the attention coordinate are decided as pixels to be referred. Herein, the pixels of 2×2 near the attention coordinate, or namely the pixel or pixels in the region containing the attention coordinate and the neighbor pixel and pixels, are set to pixels to be referred. A detailed description is as follows.

Figure 14:
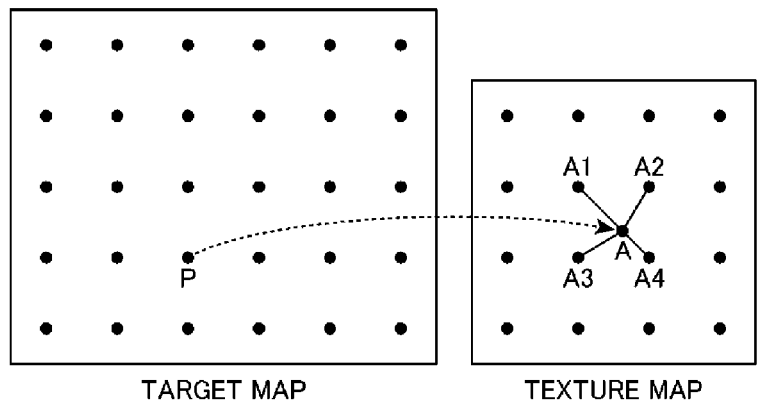
FIG. 14 is a conceptual diagram showing an example of interpolation based on a conventional texture mapping.

FIG. 14 shows an example of interpolation based on a conventional texture mapping. A production example of the pixel information DP according to the position P, relating to the target map, is shown as the following formula.

$$DP=(KA1*DA1+KA2*DA2+KA3*DA3+KA4*DA4)/(KA1+KA2+KA3+KA4)$$

That is, the attention coordinate A of the texture map corresponding to the position P of the target map is first sought by a reverse conversion. The arrow of a broken line from P to A indicates the reverse conversion. At the positions A1, A2, A3, and A4 of the four pixels near A, weighing is made according to distances to A, respectively, and weight values KA1, KA2, KA3, and KA4 are derived. The total of the four weight values is set to a constant value (e.g., one). The pixel information relating to the positions A1 to A4 is set to DA1 to DA4, and the pixel information DP relating to the position P is produced by synthesizing information "DA1 to DA4 considering KA1 to KA4."

Figure 15:
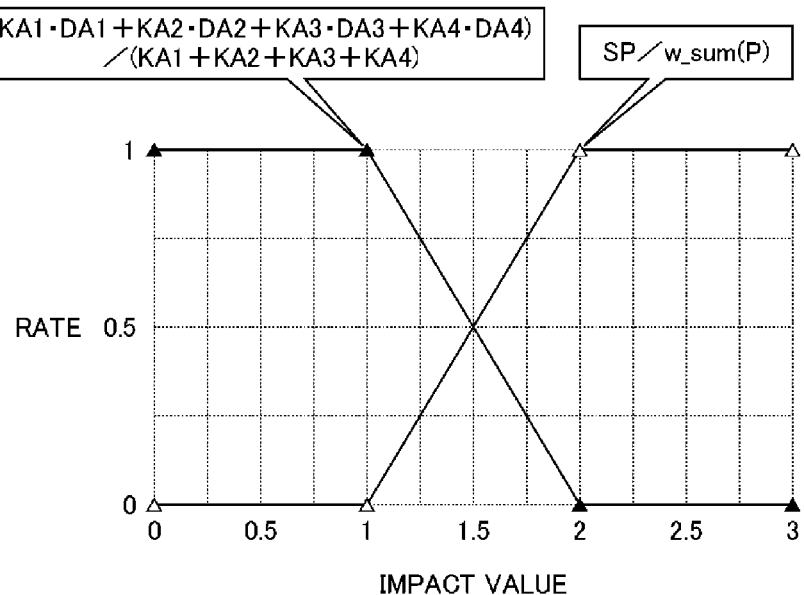
FIG. 15 is a conceptual diagram showing a way of thinking on synthesizing a value calculated from a conventional interpolation and a value calculated from an accumulation map with weighing, as a modified example.

FIG. 15 shows, as a modified example, a synthesizing thinking way with weighing the value calculated from a conventional interpolation and the value calculated from the accumulation map, and this is described.

With the example (or the processing shown in FIG. 12) described above, the different renewing methods for renewing target pixels for different cases that the impact value w_sum is equal to or greater than the constant value and that is less than the constant value, in the accumulation map, are used, but the pixel information calculating values from the two different methods and synthesizing information using a rate according to the impact value w_sum can make the pixel information of the renewing target pixel. That is, when the impact value w_sum is large, the rate using the pixel information SP at the position P of the accumulation map is made higher. This makes smooth the boundaries between the magnification portion and the reduction portion.

Figure 16A:
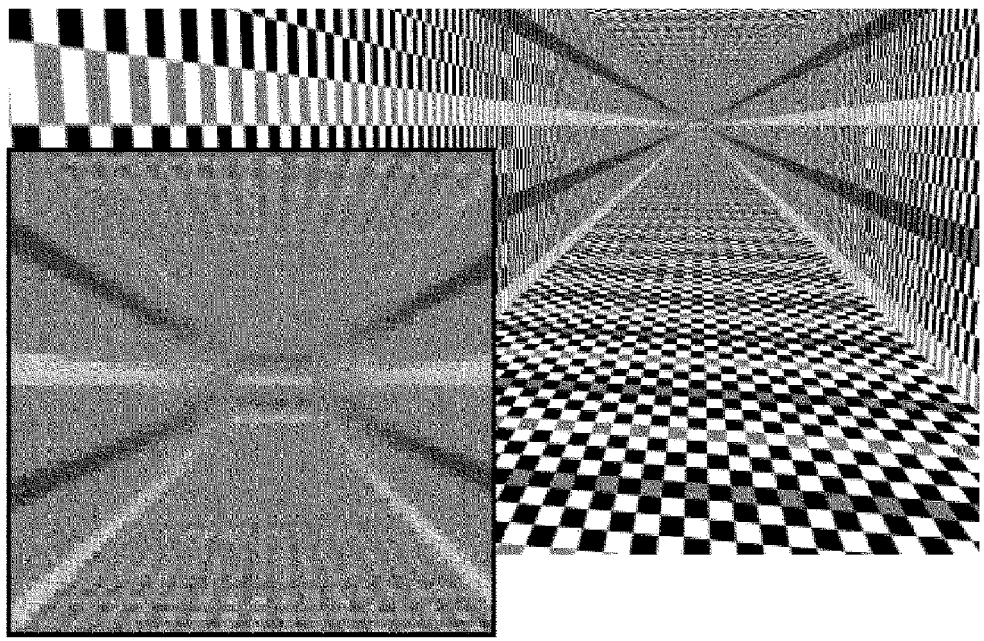
FIGS. 16A, 16B are diagrams showing an example of resampling consequences.
Figure 16B:
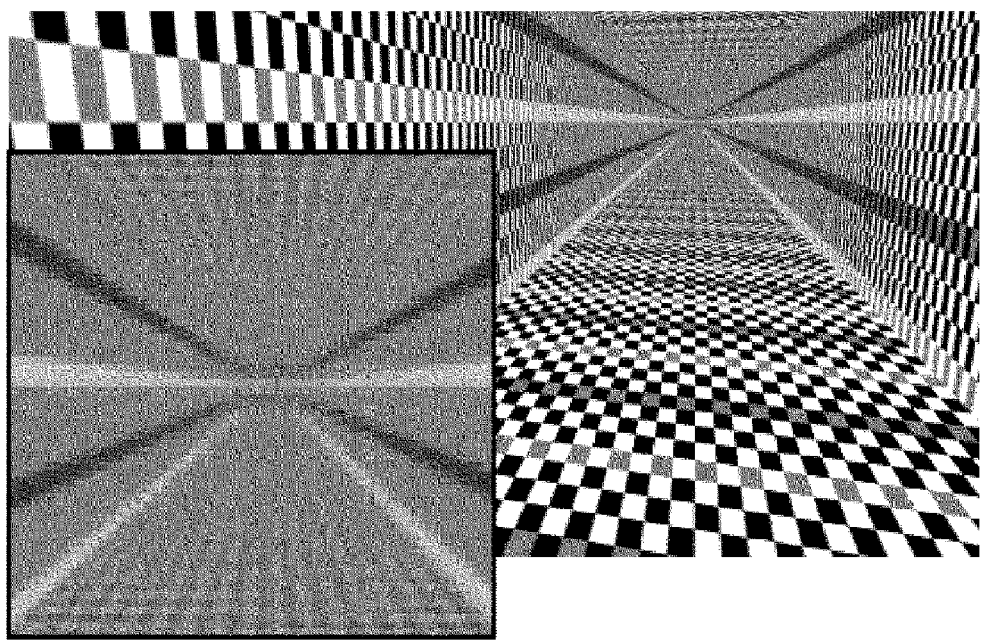

FIGS. 16A, 16B show an example of resampling consequences, and it is described. FIGS. 16A, 16B are for an example comparing a texture mapping when projecting an inside of a rectangular parallelepiped having a very long depth with an isotropic filter of a prior art means. FIG. 16A is for the prior art isotropic filter (16×sample setting), whereas FIG. 16B is for means according to the invention. In each illustration, far side portions, or namely transformations including reduction are emphasized. When viewing the checkerboard pattern and the straight line patterns, the quality of the far side portions is maintained at a high level particularly to the points of means and centroids of the pixels, as the consequence of this invention.

Second Embodiment

In the processing done by a resampling apparatus according to the second embodiment, the processing in FIG. 12 done by the resampling apparatus according to the first embodiment is altered in a way shown in FIG. 17.

Hereinafter, referring to FIG. 17, a processing flow renewing pixels of a target map based on an accumulation map, done by the resampling apparatus according to the second embodiment of the invention, is described. This flowchart shows a means suitable for transformations combined with reduction and magnification at a standard point of pixels in addition to a means for suppressing deviations from the centroid due to reduction. This also corresponds to a part of the resampling method according to the second embodiment, and corresponds to a part of the processing where the central control unit 11 executes the resampling program in the main memory 12. A detailed description is as follows.

That is, when this processing begins, the information "texture map positions (A1 to A4)" and "weight values (KA1 to KA4)" are produced from the texture map attention coordinate (A) corresponding to the position (P) of the pixel of the accumulation map (Step S51); the information "accumulation map positions (B11 to B44)" and "weight values (KB11 to KB44)" are produced from the accumulation map attention coordinates (B1 to B4) corresponding to the texture map positions (A1 to A4) (Step S52); the pixel information (DP) of the position (P) of the target map is produced from the pixel information of the accumulation map (DB11 to DB44) and the weight values (KA1 to KA4, KB11 to KB44) (Step S53), and the processing returns.

It is to be noted that term "target map" has the same meaning as the term "transformation target image," and the term "texture map" has the same meaning as the term "transformation original image."

Herein, referring to a conceptual diagram as shown in FIG. 18, a processing renewing a target map pixel based on the accumulation map is further described.

First, the attention coordinate A of the texture map corresponding to the position P of the accumulation map is sought by a reverse conversion. The arrow of a broken line from P to A indicates the reverse conversion of the coordinate. Subsequently, with respect to positions A1, A2, A3, and A4 of the four pixels near the attention coordinate A, weighing is made according to distances to A, and the weight values KA1, KA2, KA3, and KA4 are derived. The total of the four weight values is set to a constant value (e.g., one).

The attention coordinate B1 of the accumulation map corresponding to the position A1 is sought by a normal conversion. The arrow of a broken line from A1 to B1 indicates the normal conversion of the coordinate. Subsequently, with respect to positions B11, B12, B13, and B14 of the four pixels near the attention coordinate B1, weighing is made according to distances to B1, and the weight values KB11, KB12, KB13, and KB14 are derived. The total of the four weight values is set to a constant value (e.g., one).

Where the coordinate map is used, if the coordinate information as the element of the position A1 of the coordinate map exists, the coordinate information may be set to B1.

The coordinates and positions corresponding to A2, A3, and A4 are derived in substantially the same way, though omitting an illustration.

The pixel information relating to the positions B11 to B44 is set to DB11 to DB44, and the pixel information DP relating to the position P is produced by synthesizing DB11 to DB44 in consideration of KB11 to KB44 and KA1 to KA4.

In a state that scanning on the side of the texture map described above is completed, renewing the pixels of the accumulation map may be done irregularly at a magnification portion, and some pixel may be not renewed at all according to the position. The coordinate conversion for referring to the accumulation map using the method described herein is already done at a time of renewing on the side of the texture map, and further the pixel of the related accumulation map is renewed. That is, the position of the pixel not subject to the renewal operation at all may not be derived. Accordingly, the processings of reduction and magnification are not necessary to be separated, so that it can be said that this method has resampling operation suitable for transformation combined with reduction and magnification at the standard point of the image.

FIG. 19 shows examples of resampling results according to the second embodiment.

The normal conversion of the coordinates (input to output), and the reverse conversion of the coordinates (output to input) are indicated with the following formulae.

The normal conversion of the coordinates (input to output):

$$X\_OUT=(w/2)+\cos(X\_IN/w*2*PI)*Y\_IN/h*(w/2)$$

$$Y\_OUT=(h/2)+\sin(X\_IN/w*2*PI)*Y\_IN/h*(h/2)$$

The reverse conversion of the coordinates (output to input):

$$X\_IN=a\tan 2((Y\_OUT-h/2)/h,(X\_OUT-w/2)/w)/(2*PI)*w$$

$$Y\_IN=\operatorname{sqrt}(((X\_OUT-w/2)/(w/2))^2+((Y\_OUT-h/2)/(h/2))^2)*h$$

FIGS. 19A, 19B, 19C, and 19D are an example of consequences of transformation under a polar coordinate conversion with means of the resampling apparatus according to the second embodiment of the invention.

Figure 19A:
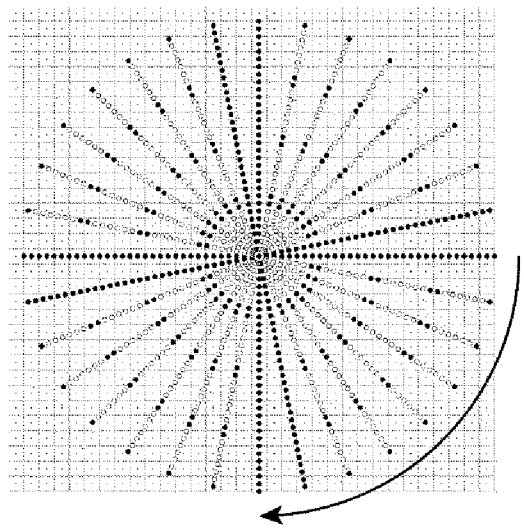
FIGS. 19A to 19D are diagrams showing an example of resampling consequences according to the second embodiment.
Figure 19B:
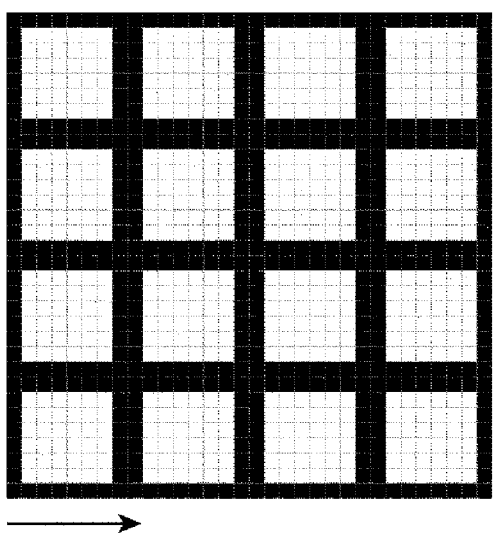
Figure 19C:
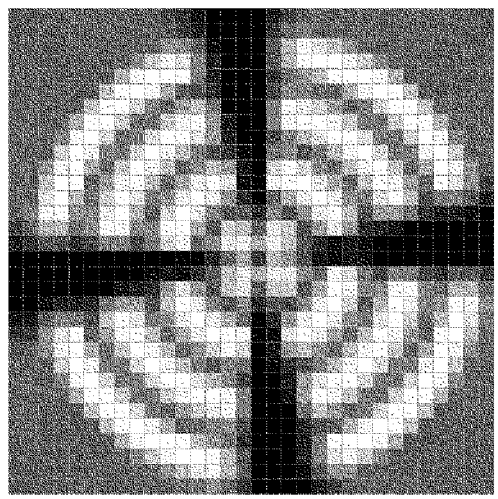
Figure 19D:
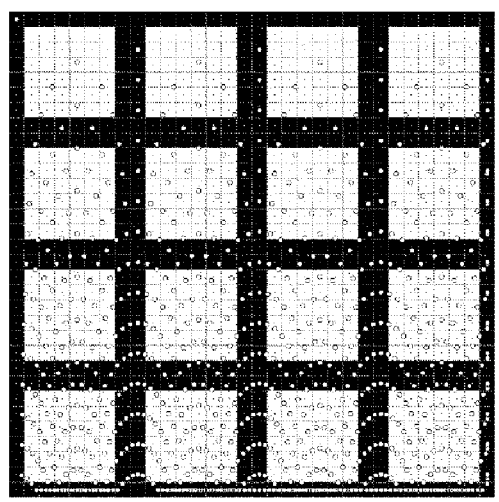

FIG. 19B shows a transformation original image, and is an example in which a cubic is arranged as a pattern in a lattice shape. The topmost portion of the transformation original image corresponds to a center of the transformation target image, and a segment from the left lower portion to the right lower portion of the transformation original image corresponds to a circle going round a one turn in a clockwise direction from the right end of the transformation target image. FIG. 19A shows a coordinate sought through the normal conversion from the positions of the respective pixels of the transformation original image, in the accumulation map, and the pixels in black are indicated as black filled circle marks whereas the pixels in white are indicated as white circle marks. FIG. 19D shows a coordinate sought through the reverse conversion from the positions of the respective pixels forming the transformation target image, in the transformation original image, as white circle marks.

The example shown in FIG. 19A is a transformation in which the transformation becomes reduced because the coordinate group is dense in the radial direction around an end of the circle, and in which the transformation becomes magnified because the coordinate group is thin in the circumferential direction. As a result of the transformation, as shown in FIG. 19C, jaggies are suppressed by the interpolation in the direction of magnification, and aliasing is suppressed by averaging operation in the direction of reduction.

As described above, the first and second embodiments of the invention are described in detail, but this invention is not limited to those, and various modifications and alterations are possible in a range not deviated from the scope of the invention.

For example, this invention is applicable to a drawing processing in an omnidirectional image editing apparatus as set forth in the specification and the drawings of Japanese Patent Application Publication No. 2011-096940. In this case, where it is in a state that a viewing angle is set extremely small, or namely in fine drawing in a state that the display is enlarged, resampling operation suppressing deviations of the centroid due to reduction is obtainable. Where it is in a state that a viewing angle is set extremely large, or namely in drawing for expressions of perspective feeling in a state that the display is made in a wide range, resampling operation suitable for transformation combined with reduction and magnification at the standard point of the image.

This invention does not use any means limited up to two dimension. Accordingly, any processing is extendable to three-dimension (e.g., transformation of the three-dimension data using a voxel).

DESCRIPTION OF REFERENCE NUMBER

1 Resampling Apparatus, 10 Personal Computer, 11 Central Control Unit, 12 Main Memory, 13 Image Controller, 13a Video Memory, 14 Input and Output Controller, 15 Internal Non-Volatile Memory Medium, 16 Medium Read/Write Interface, 20 Display Device, 30 Transformation Parameter Input Device, 40 Transformation Original Image Input Data, 41 Transformation Target Image Output Data, 42 Transformation Method Definition Data. 50 Program Data.

What is claimed is:

1. A resampling method using an accumulation map having a sequence common with a transformation target image, comprising:

a first step of scanning a transformation original image to renew the accumulation map based on the transformation original image; and a second step of scanning the transformation target image to renew the transformation target image based on the accumulation map, wherein the first step includes the steps of initializing the accumulation map, repeating extraction of a subsequent pixel of the transformation original image until all of the pixels contained in a transforming range in the transformation original image have been extracted, and renewing a pixel group of the accumulation map corresponding to pixels of the transformation original image, and wherein renewing the pixel group of the accumulation map corresponding to the pixels of the transformation original image is done with a step renewing an accumulation map pixel information group from pixel information and a weight value of the transformation original image upon calculating a position and a weight value of the accumulation map from an accumulation map attention coordinate corresponding to the position of respective pixel of the transformation original image.

2. The resampling method according to claim 1, wherein the transforming range in the transformation original image is made of a polygon plane, and in the first and second steps, a subsequent polygon plane of the transformation original image is continuously extracted until each polygon plane of the transformation original image is extracted.

3. The resampling method according to claim 1, wherein the second step includes the steps of extracting a subsequent pixel of the transformation target image until all of the pixels contained in a transforming range in the transformation target image have been extracted, and renewing the subsequent pixel of the transformation target image based on the accumulation map, and wherein renewing the subsequent pixel of the transformation target image based on the accumulation map is done with the steps of calculating the position and the weight value of the transformation original image from the attention coordinate of the transformation original image corresponding to the position of a pixel of the accumulation map, calculating the position and the weight value of the accumulation map from the attention coordinate of the accumulation map corresponding to the position of the transformation original image, and producing the pixel information of the position of the transformation target image from the pixel information and the weight value of the accumulation map.

4. The resampling method according to claim 3, wherein the transforming range in the transformation original image is made of a polygon plane, and in the first and second steps, a subsequent polygon plane is continuously extracted until each polygon plane of the transformation original image is extracted.

5. The resampling method according to claim 1, wherein the second step includes the steps of extracting a subsequent pixel of the transformation target image until all of the pixels contained in a transforming range in the transformation target image are extracted, and renewing the subsequent pixel of the transformation target image based on the accumulation map, and wherein renewing the subsequent pixel of the transformation target image based on the accumulation map is done with the steps of judging as to whether an impact value of pixel information regarding the position of the subsequent pixel of the accumulation map is equal to or greater than a prescribed value, producing the pixel information of the transformation target image from the pixel information of the accumulation map if the impact value is equal to or greater than the prescribed value, and producing the pixel information of the transformation target image from the pixel information of the transformation original image with a prescribed interpolation method if the impact value is not equal to or greater than the prescribed value.

6. The resampling method according to claim 5, wherein the transforming range in the transformation original image is made of a polygon plane, and in the first and second steps, a subsequent polygon plane is continuously extracted until all of the polygon planes of the transformation original image are extracted.

7. A resampling apparatus using an accumulation map having a sequence common with a transformation target image, comprising:

a computer configured to function as a central control means for executing a resampling program, wherein the central control means executes a first step of scanning a transformation original image to renew the accumulation map based on the transformation original image, and a second step of scanning the transformation target image to renew the transformation target image based on the accumulation map, wherein the central control means initializes the accumulation map, repeats extraction of a subsequent pixel of the transformation original image until all of the pixels contained in a transforming range in the transformation original image are extracted, and renews a pixel group of the accumulation map corresponding to pixels of the transformation original image, and wherein the central control means performs, as renewing the pixel group of the accumulation map corresponding to the pixels of the transformation original image, renewing an accumulation map pixel information group from pixel information and a weight value of the transformation original image upon calculating a position and a weight value of the accumulation map from an accumulation map attention coordinate corresponding to the position of respective pixel of the transformation original image.

8. The resampling apparatus according to claim 7, wherein the transforming range in the transformation original image is made of a polygon plane, and in the first and second steps, a subsequent polygon plane is continuously extracted until each polygon plane of the transformation original image is extracted.

9. The resampling apparatus according to claim 7, wherein the central control means performs, as the second step, the steps of extracting a subsequent pixel of the transformation target image until all of the pixels contained in a transforming range in the transformation target image are extracted, and renewing the subsequent pixel of the transformation target image based on the accumulation map, and wherein the central control means performs, as renewing the subsequent pixel of the transformation target image based on the accumulation map, the steps of calculating the position and the weight value of the transformation original image from the attention coordinate of the transformation original image corresponding to the position of a pixel of the accumulation map, calculating the position and the weight value of the accumulation map from the attention coordinate of the accumulation map corresponding to the position of the transformation original image, and producing the pixel information of the position of the transformation target image from the pixel information and the weight value of the accumulation map.

10. The resampling apparatus according to claim 9, wherein the transforming range in the transformation original image is made of a polygon plane, and in the first and second steps, a subsequent polygon plane is continuously extracted until each polygon plane of the transformation original image is extracted.

11. The resampling apparatus according to claim 7, wherein the central control means performs, as the second step, the steps of extracting a subsequent pixel of the transformation target image until all of the pixels contained in a transforming range in the transformation target image are extracted, and renewing the subsequent pixel of the transformation target image based on the accumulation map, and wherein the central control means performs, as renewing the pixel of the transformation target image based on the accumulation map, the steps of judging as to whether an impact value of pixel information regarding the position of a pixel of the accumulation map is equal to or greater than a prescribed value, producing the pixel information of the transformation target image from the pixel information of the accumulation map if the impact value is equal to or greater than the prescribed value, and producing the pixel information of the transformation target image from the pixel information of the transformation original image with a prescribed interpolation method if the impact value is not equal to or greater than the prescribed value.

12. The resampling apparatus according to claim 11, wherein the transforming range in the transformation original image is made of a polygon plane, and in the first and second steps, a subsequent polygon plane is continuously extracted until each polygon plane of the transformation original image is extracted.

13. A non-transitory computer readable recording medium having a resampling program recorded therein, the resampling program allowing a computer to function as a central control means executing a first step of scanning a transformation original image to renew an accumulation map having a sequence common with a transformation target image, based on the transformation original image, and a second step of scanning the transformation target image to renew the transformation target image based on the accumulation map, wherein the first step includes initializing the accumulation map, repeating extraction of a subsequent pixel of the transformation original image until each pixel of the transformation original image contained in a transforming range in the transformation original image is extracted, and renewing a pixel group of the accumulation map corresponding to pixels of the transformation original image, and wherein renewing the pixel group of the accumulation map corresponding to the pixels of the transformation original image is done with a step renewing an accumulation map pixel information group from pixel information and a weight value of the transformation original image upon calculating a position and a weight value of the accumulation map from an accumulation map attention coordinate corresponding to the position of respective pixel of the transformation original image.

14. The non-transitory computer readable recording medium according to claim 13, wherein the transforming range in the transformation original image is made of a polygon plane, and in the first and second steps, a subsequent polygon plane of the transformation original image is continuously extracted until each polygon plane of the transformation original image is extracted.

15. The non-transitory computer readable recording medium according to claim 13, wherein the second step includes the steps of extracting a subsequent pixel of the transformation target image until each pixel contained in a transforming range in the transformation target image is extracted, and renewing the subsequent pixel of the transformation target image based on the accumulation map, and wherein renewing the subsequent pixel of the transformation target image based on the accumulation map is done with the steps of calculating the position and the weight value of the transformation original image from the attention coordinate of the transformation original image corresponding to the position of a pixel of the accumulation map, calculating the position and the weight value of the accumulation map from the attention coordinate of the accumulation map corresponding to the position of the transformation original image, and producing the pixel information of the position of the transformation target image from the pixel information and the weight value of the accumulation map.

16. The computer readable recording medium according to claim 15, wherein the transforming range in the transformation original image is made of a polygon plane, and in the first and second steps, a subsequent polygon plane of the transformation original image is continuously extracted until each polygon plane of the transformation original image is extracted.

17. The non-transitory computer readable recording medium according to claim 13, wherein the second step includes the steps of extracting a subsequent pixel of the transformation target image until each pixel contained in a transforming range in the transformation target image is extracted, and renewing the subsequent pixel of the transformation target image based on the accumulation map, and wherein renewing the subsequent pixel of the transformation target image based on the accumulation map is done with the steps of judging as to whether an impact value of pixel information regarding the position of a pixel of the accumulation map is equal to or greater than a prescribed value, producing the pixel information of the transformation target image from the pixel information of the accumulation map if the impact value is equal to or greater than the prescribed value, and producing the pixel information of the transformation target image from the pixel information of the transformation original image with a prescribed interpolation method if the impact value is not equal to or greater than the prescribed value.

18. The non-transitory computer readable recording medium according to claim 17, wherein the transforming range in the transformation original image is made of a polygon plane, and in the first and second steps, a subsequent polygon plane of the transformation original image is continuously extracted until each polygon plane of the transformation original image is extracted.

* * * * *